United States Patent [19]

Kang

[11] 3,914,207

[45] Oct. 21, 1975

[54] PROCESS FOR COPOLYMERIZING CONJUGATED DIENES AND ALPHA-OLEFINS

[75] Inventor: Jung Wong Kang, Clinton, Ohio

[73] Assignee: The Firestone Tire & Rubber Company, Akron, Ohio

[22] Filed: Sept. 26, 1974

[21] Appl. No.: 509,516

[52] U.S. Cl. ...... 260/85.3 R; 260/82.1; 260/94.2 M; 260/80 C
[51] Int. Cl.$^2$..................... C08F 4/44; C08F 236/00
[58] Field of Search........ 260/94.2 M, 85.3 R, 82.1, 260/80 C

[56] References Cited
FOREIGN PATENTS OR APPLICATIONS
2,047,646  12/1971  France .......................... 260/94.2 M OTHER PUBLICATIONS
"Organic Sulfur Compounds," N. Kharasch, Vol. 1, Pergamon Press, N.Y., 1961.

*Primary Examiner*—Joseph L. Schofer
*Assistant Examiner*—F. R. Cervi

[57] ABSTRACT

Conjugated dienes and olefins, such as butadiene and propylene, are copolymerized by a catalyst system comprising a metal component, $TiCl_nBr_{4-n}$ or $VCl_mBr_{5-m}$, a reducing agent of the formula $AlR_3$ wherein R is hydrogen or a hydrocarbon group, and an organic sulfoxide such as diphenyl sulfoxide. The use of the organic sulfoxide modifier allows the use of higher and more practical temperatures to obtain desirable molecular weights, yields and microstructure than the prior art related copolymerizations which require much lower and less practical polymerization temperatures to obtain corresponding results.

19 Claims, No Drawings

PROCESS FOR COPOLYMERIZING CONJUGATED DIENES AND ALPHA-OLEFINS

BACKGROUND OF THE INVENTION

1. Field of the Invention

This invention relates to the copolymerization of conjugated dienes, such as 1,3-butadiene, with alpha-olefins, such as propylene. More specifically this invention involves the copolymerization of conjugated dienes with alpha-olefins in the presence of a novel catalyst composition.

2. Related Prior Art

French Pat. No. 2,047,646 describes the copolymerization of butadiene and propylene in the presence of a metal compound such as $TiCl_4$, and $AlR_3$ reducing agent in which R is hydrocarbon, and a carbonyl-containing compound. While the general discussion of the invention refers to liquid phase polymerization at temperatures in the range of $-100°C$ to $50°C$, the preferred temperature is $-40°C$ to $-30°C$ which is confirmed by the fact that in patentee's 30 working examples a polymerization temperature of $-30°C$ is used in 24 of these examples and $-40°C$ in four examples. It appears that these low polymerization temperatures are necessary to obtain patentee's optimum results in molecular weight, microstructure and other properties in their copolymers.

SUMMARY OF THE INVENTION

It has now been found that by use of an organic sulfoxide, such as diphenyl sulfoxide ($C_6H_5SOC_6H_5$), instead of the carbonyl-containing modifiers used in the prior art, in a catalyst composition using $TiCl_nBr_{4-n}$ or $VCl_mBr_{5-m}$ wherein $n$ has a value of 0 to 4 and $m$ has a value of 0 to 5, and an aluminum reducing agent such as aluminum trihydrocarbon, it is possible to conduct the copolymerization of conjugated dienes and alpha-olefins at higher and more practical temperatures, without sacrificing the desired properties in the polymer products. In other words with an organic sulfoxide as the modifier in the catalyst composition, it is possible to copolymerize these comonomers at 5°C to give copolymers having sufficiently high molecular weights and other desirable properties that with carbonyl-containing compounds and aluminum trihydrocarbon as the reducing agent polymerization temperatures of $-30°C$ or lower are necessary to produce similar results in the copolymers. The resulting copolymers are predominantly alternate copolymers with minor amounts of block and random copolymerization occurring, depending on the proportions of diene and olefin used in the comonomer starting mixture.

As stated above the reducing component is $AlR_3$ wherein R is hydrogen or a hydrocarbon group of no more than 20 carbon atoms, and preferably there is at least one hydrocarbon group present. Alkyl groups of 1–8 carbon atoms are preferred in these compounds but even larger groups or aromatic or cycloaliphatic groups such as phenyl, tolyl, xylyl, naphthyl, cyclohexyl, cycloheptyl, etc., may also be present in place of the alkyl groups in the respective compounds. These compounds include aluminum trihydrocarbons, aluminum trihydride, dihydrocarbon aluminum hydrides and hydrocarbon aluminum dihydrides.

Typical aluminum compounds that may be used include, but are not limited to: trimethyl aluminum, triethyl aluminum, tributyl aluminum, tripropyl aluminum, triheptyl aluminum, trioctyl aluminum, triphenyl aluminum, tritolyl aluminum, dimethylphenyl aluminum, tribenzyl aluminum, diethyl benzyl aluminum, tricyclohexyl aluminum, dimethyl cyclohexyl aluminum, dimethyl-cycloheptyl aluminum, dimethyl aluminum hydride, diethyl aluminum hydride, dihexyl aluminum hydride, dipropyl aluminum hydride, diphenyl aluminum hydride, dicyclohexyl aluminum hydride, ethyl aluminum dihydride, butyl aluminum dihydride, amyl aluminum dihydride, octyl aluminum dihydride, phenyl aluminum dihydride, cycloheptyl aluminum dihydride, aluminum trihydride, and the like.

The titanium and vanadium halide components are represented by the formulas $TiBr_nCl_{4-n}$ and $VBr_mCl_{5-m}$ where $n$ has a value from 0 to 4 and $m$ has a value of 0 to 5. Preferably the titanium or vanadium is completely saturated with chloride. However, various degrees of substitution by bromine also give suitable results. Such compounds include $TiCl_4$, $VCl_5$, $TiBrCl_3$, $TiBr_2Cl_2$, $TiBr_3Cl$, $TiBr_4$, $VBrCl_4$, $VBr_2Cl_3$, $VBr_3Cl_2$, $VBr_4Cl$ and $VBr_5$.

Organic sulfoxides that may be used as the modifier in the catalyst composition of this invention have the formula $R_a$—SO—$R_b$ wherein $R_a$ and $R_b$ are hydrocarbon groups of 1–20 carbon atoms, preferably 1–10 carbon atoms. They may be aliphatic, aromatic and cycloaliphatic and may have derivative groups thereon provided such groups are inert and do not interfere with the catalytic function of this compound, such as chlorine or acetoxy substituted on an aromatic ring. Advantageously these compounds are free of ethylenic and acetylenic unsaturation. Typical compounds suitable for this purpose are dimethyl sulfoxide, diethyl sulfoxide, dibutyl sulfoxide, dioctyl sulfoxide, diphenyl sulfoxide, ditolyl sulfoxide, p,p'-dichlorodiphenyl sulfoxide, p-chlorodiphenyl sulfoxide, dinaphthyl sulfoxide, bis(nonylphenyl) sulfoxide, dicyclohexyl sulfoxide, dicycloheptyl sulfoxide, etc.

The molar ratio of aluminum to Ti or V in the catalyst composition is advantageously in the range of 1.0 to 4.0 moles per mole of Ti or V compound. The molar ratio of sulfoxide compound to Ti or V is advantageously in the range of 0.7 to 4 moles preferably 1–2 moles per mole of Ti or V compound.

The catalyst is used in a proportion of 0.1 to 4 millimoles per 100 grams of monomer. In referring to millimoles of catalyst, this corresponds to the millimoles of the titanium or vanadium compound since the catalyst is regarded or at least calculated as a complex of the titanium or vanadium compound with the other catalyst components.

Polymerization may be conducted at a temperature of $-50°$ to $50°C$., but preferably at $0°–50°C$. At temperatures of $0°$ to $50°C$ polymers are produced with yields generally of 50–80%, and molecular weights generally no higher than 500,000, preferably in the range of about 100,000 to 200,000. At these temperatures the polymerization rate is reasonably fast and very practical use is made of this catalyst. This is in contrast to prior art processes which require temperatures of $-40°$ to $0°C$. to obtain practical molecular weights.

The microstructure of the butadiene portion of the copolymer is generally about 30–70% trans-1,4, about 20–60% cis-1,4 and about 3–10% 1,2. The copolymers have a high degree of alternate distribution of comonomer repeating units although there may also be some random and block copolymer formed depending somewhat on the proportions of diene and olefin used. The copolymers also have a low glass transition temperature −105° to −70°C., which is desirable for good tire properties.

Generally the molar ratio of olefin to diene in the copolymer product is lower than the corresponding molar ratio in the starting monomer mixture. Therefore, it is desirable to use a higher molar mixture of olefin to diene in the monomer mix in order to produce the desired molar proportion in the copolymer product.

The polymerization is advantageously effected in the presence of an inert diluent to facilitate handling of the polymer and to give better temperature control. Normally liquid hydrocarbons are preferred for this purpose, such as benzene, toluene, aliphatic hydrocarbons such as n-hexane, n-heptane, cyclohexane, etc. or propane, butane, propylene, ethylene, ethane, etc. with the use of higher pressures. However, where provision is made for external heat dissipation and temperature control, the solvent can be omitted.

The polymerization is advantageously conducted in a pressure vessel to avoid loss of monomer and solvent, particularly if temperatures are to be used at or above the boiling point of either.

Conjugated dienes that may be copolymerized in accordance with this invention include: 1,3-butadiene, isoprene, chloroprene, 2-phenyl-1,3-butadiene, piperylene, etc.

The alpha-olefins that may be copolymerized with the conjugated diene include ethylene, propylene, n-butene-1, isobutylene, n-pentene-1, and other alpha-olefins having up to 10 carbon atoms, including aryl-substituted olefins, such as styrene, alphamethylstyrene, vinyl toluene, vinyl naphthalene, etc.

In the comonomer mixture, the propylene or other olefin is used in an amount representing 10–90%, preferably 10–50% by weight of the total monomers. In the resultant copolymer, the proportion of olefin depends somewhat on the degree of conversion but in most cases is in the range of 5–90%, preferably 10–85% olefin.

Notable results in copolymer formation are observed after a reaction period of one hour. However it is generally desirable to extend the reaction period to 10–30 hours to obtain the most efficient yields. Generally, however, while even longer reaction periods may be used they produce little or no greater advantage.

The rubbery copolymer of 1,3-butadiene and olefin produced by the present invention has processing properties and practical physical properties superior to those of rubber products obtained from natural rubber. It can be used for articles such as tire carcases, tire treads, belting, industrial articles sponge products and car accessories.

For the production of rubber products the copolymer may be mixed with other rubbery materials such as natural rubber, butadiene-styrene rubber, polybutadiene rubber, polyisoprene rubber, chloroprene rubber, butadiene-acrylonitrile rubber, butadiene-methacrylate rubber and ethylene-propylene rubber in any desired proportion. It is effective for improving the processing properties and practical properties of such rubbery materials. Generally, such a rubber composition should contain at least 20% by weight of the copolymer of the present invention. Below 20%, there is little improvement in the processing properties and the physical properties of the cured rubber products.

The "dilute solution viscosity" referred to herein is defined as the inherent viscosity determined at 25°C. on a 0.4% solution of the polymer in toluene. It is calculated by dividing the natural logarithm of the relative viscosity by the percent concentration of the solution, i.e., it is the inherent viscosity measured at 0.4% concentration. The molecular weights reported herein are determined from these viscosities and are the number average molecular weights.

SPECIFIC EMBODIMENTS OF THE INVENTION

Most of the copolymerizations described below in the working examples are conducted in 28 oz. beverage bottles. These bottles are over-dried overnight and then capped with crown, three-hole caps and rubber liners. The bottles are cooled and purged with a stream of nitrogen. After cooling, the bottles are charged, by means of a syringe needle inserted through the rubber liner of the cap, with the diene-olefin-diluent blend at 0°C and the sulfoxide modifier, metal compound and aluminum compound are charged in that order. The bottles are then placed in a constant temperature bath equipped with a device for agitating the bottles and retained therein for the desired reaction period. The copolymerization is terminated at the appropriate time by the addition of a methanol-antioxidant solution and the copolymer product is coagulated by pouring the reaction mass into a large volume of methanol containing an antioxidant. The recovered polymer is dried and analyzed by means of infrared spectra.

The invention is illustrated by the following examples which are intended merely for purpose of illustration and are not to be regarded as limiting the scope of the invention or the manner in which it may be practiced. Unless specifically indicated otherwise, parts and percentages are given by weight.

EXAMPLE I

A series of ten copolymerizations are conducted in bottles according to the procedure described above, using a blend containing 10.66% butadiene, 8.25% propylene and 81.09% toluene, (the propylene representing 43.6 wt. % or 50 mole % of the monomer portion) with 1.65 millimoles of TiCl₄ used per 100 gms of monomer, diisobutyl aluminum hydride in an amount to give an Al/Ti ratio of 3/1, a reaction temperature of 5°C, a reaction time of 20 hours, and the sulfoxide is diphenyl sulfoxide with the amount varied as shown below with the tabulated results in Table I:

TABLE I

|  | A | B | C | D | E |
|---|---|---|---|---|---|
| Molar Ratio SO/Ti | 0.3 | 0.4 | 0.5 | 0.6 | 0.6 |
| Conversion (%) | 30.0 | 30.3 | 42.0 | 50.0 | 50.0 |
| IR Spectra |  |  |  |  |  |
| cis-1,4 (%) | 19.3* | 22.9 | 31.4 | 26.4 | 21.8 |
|  | 29.9** | 34.4 | 48.3 | 42.8 | 33.2 |
| trans-1,4 (%) | 41.0 | 39.6 | 28.5 | 31.0 | 39.8 |
|  | 63.6 | 59.8 | 45.2 | 50.4 | 61.0 |

TABLE I—Continued

|  | A | B | C | D | E |
|---|---|---|---|---|---|
| 1,2 (%) | 4.1 | 3.9 | 4.1 | 4.1 | 3.8 |
|  | 6.4 | 5.8 | 6.5 | 6.7 | 5.9 |
| Wt. % Propylene | 35.1 | 33.6 | 36.1 | 38.5 | 34.6 |
| DSV | 1.37 | 1.37 | 1.50 | 1.66 | 1.55 |
| % Gel | 0.0 | 0.0 | 0.0 | 0.0 | 0.0 |
| Glass Transition | −84 | −79 | −81 | −80 | −81 |
| Temp. (Tg) °C. | −103 (3:1)*** | −102(s) | −102(s) | −102(s) |  |

*The first values include the percent of propylene.
**The second values are based on only the butadiene portion of the copolymer.
***There is approximately three times as much of the copolymer melting at −84 as at −103; (s) means a slight amount; and (vs) means very slight amount.

EXAMPLE II

The procedure of Example I is repeated with increased amounts of sulfoxide. The results are tabulated below:

TABLE II

|  | A | B | C | D | E |
|---|---|---|---|---|---|
| Molar Ratio SO/Ti | 0.7 | 0.8 | 0.9 | 1.0 | 1.2 |
| Conversion (%) | 61.0 | 60.0 | 62.5 | 58.2 | 52.0 |
| IR Spectra |  |  |  |  |  |
| cis-1,4 (%) | 19.7 | 22.6 | 27.8 | 20.6 | 25.0 |
|  | 30.9 | 35.1 | 41.3 | 31.6 | 36.8 |
| trans-1,4 (%) | 40.5 | 38.2 | 36.3 | 40.7 | 39.1 |
|  | 63.5 | 59.1 | 53.9 | 62.7 | 57.6 |
| 1,2 (%) | 3.6 | 3.8 | 3.3 | 3.7 | 3.7 |
|  | 5.6 | 5.9 | 4.9 | 5.7 | 5.7 |
| Wt. % Propylene | 36.3 | 35.4 | 32.7 | 35.1 | 32.2 |
| DSV | 1.54 | 1.81 | 1.77 | 1.90 | 2.04 |
| % Gel | 0.0 | 0.0 | 0.0 | 0.0 | 0.0 |
| Tg (°C.) | −79 | −80 | −79 | −79 | −80 |

EXAMPLE III

The procedure of Example I is repeated three times using the same conditions and proportions except that the SO/Ti molar ratio is maintained at 0.8/1 and the ratio of diisobutyl aluminum hydride to TiCl₄ is varied as shown with the results in the following table:

TABLE III

|  | A | B | C | D | E | F | G |
|---|---|---|---|---|---|---|---|
| SO/Ti ratio | 1.50 | 1.75 | 2.00 | 2.25 | 2.50 | 2.75 | 3.00 |
| Conversion (%) | 3.3 | 8.3 | 12.8 | 49.0 | 52.0 | 53.0 | 62.3 |
| IR Spectra |  |  |  |  |  |  |  |
| cis-1,4 (%) | 37.2 | 38.7 | 38.1 | 34.8 | 26.7 | 27.0 | 22.0 |
|  | 50.8 | 52.9 | 50.7 | 48.6 | 38.5 | 41.0 | 33.4 |
| trans-1,4 (%) | 32.3 | 30.0 | 33.0 | 33.7 | 39.5 | 35.3 | 41.0 |
|  | 44.1 | 41.0 | 44.0 | 47.1 | 56.9 | 53.7 | 61.8 |
| 1,2 (%) | 3.8 | 4.5 | 4.0 | 3.1 | 3.2 | 3.5 | 3.3 |
|  | 5.2 | 6.2 | 5.3 | 4.3 | 4.6 | 5.3 | 5.0 |
| Wt. % Propylene | 26.8 | 26.8 | 25.0 | 28.5 | 30.6 | 34.2 | 33.6 |
| DSV | — | 2.12 | 2.34 | 1.92 | 1.86 | 1.89 | 1.79 |
| Gel (%) | — | 0.0 | 0.0 | 0.0 | 0.0 | 0.0 | 0.0 |
| Tg (°C) | — | −74 −86 −105 (1:3:2) | −86 −106 (3:1) | −84 −104 (4:1) | −82 −105 (5:1) | −81 −103(vs) | −79 |

EXAMPLE IV

The procedure of Example I is repeated three times using triisobutyl aluminum instead of diisobutyl aluminum hydride as the reducing agent with the i—Bu₃Al/-TiCl₄ molar ratio being 3.0/1 and a reaction time of 21 hours with the results shown in the following table:

TABLE IV

|  | A | B | C |
|---|---|---|---|
| mM Ti/phgm | 1.65 | 1.65 | 1.65 |
| SO/Ti ratio | 0.3/1 | 0.4/1 | 0.5/1 |
| Al/Ti ratio | 3/1 | 3/1 | 3/1 |
| Conversion (%) | 21.5 | 21.5 | 31.4 |
| IR Spectra |  |  |  |
| cis-1,4 (%) | 22.2 | 17.8 | 22.1 |
|  | 35.7 | 27.7 | 37.0 |
| trans-1,4 (%) | 35.8 | 38.4 | 34.0 |
|  | 57.8 | 64.1 | 56.8 |
| 1,2 (%) | 4.1 | 3.7 | 3.7 |
|  | 6.7 | 6.2 | 6.2 |
| Wt. % Propylene | 38.0 | 40.1 | 40.2 |
| DSV | 1.17 | 1.12 | 1.25 |
| Gel (%) | 0.0 | 0.0 | 0.0 |
| Tg (°C) | −73 −82 (1:1) −102(vs) | −76 | −79 |

EXAMPLE V

The procedure of Example IV is repeated twice using a i-Bu₃Al/TiCl₄ molar ratio of 2.75/1 with the results shown in the following table:

TABLE V

|  | A | B |
|---|---|---|
| mM Ti/phgm | 1.65 | 1.65 |
| SO/Ti ratio | 0.8 | 1.0 |

TABLE V-Continued

|  | A | B |
|---|---|---|
| Al/Ti ratio | 2.75/1 | 2.75/1 |
| Conversion (%) | 55.7 | 51.7 |
| IR Spectra |  |  |
| cis-1,4 (%) | 20.8 | 21.4 |
|  | 30.0 | 32.8 |
| trans-1,4 (%) | 38.8 | 40.5 |
|  | 61.5 | 62.0 |
| 1,2 (%) | 3.4 | 3.4 |
|  | 5.4 | 5.2 |
| Wt. % Propylene | 37.0 | 34.8 |
| DSV | 1.50 | 1.74 |
| Gel (%) | 0.0 | 0.0 |
| Tg (°C) | −80 | −80 |
|  | −103(vs) | −103(s) |

EXAMPLE VI

The procedure of Example IV is repeated six times using a i-Bu$_3$Al/TiCl$_4$ molar ratio of 2.5/1 with the results shown in the following table:

TABLE VI

|  | A | B | C | D | E | F |
|---|---|---|---|---|---|---|
| mM Ti/phgm | 1.65 | 1.65 | 1.65 | 1.65 | 1.65 | 1.65 |
| SO/Ti ratio | 0.5 | 0.6 | 0.7 | 0.8 | 0.9 | 1.0 |
| Al/Ti ratio | 2.5/1 | 2.5/1 | 2.5/1 | 2.5/1 | 2.5/1 | 2.5/1 |
| Conversion (%) | 50.0 | 54.0 | 57.0 | 58.0 | 55.0 | 48.3 |
| IR Spectra |  |  |  |  |  |  |
| cis-1,4 (%) | 18.0 | 20.6 | 22.7 | 22.2 | 22.3 | 23.4 |
|  | 28.1 | 31.6 | 36.6 | 33.3 | 34.3 | 35.0 |
| trans-1,4 (%) | 42.9 | 41.5 | 35.5 | 41.4 | 39.6 | 40.1 |
|  | 67.0 | 63.7 | 57.4 | 62.0 | 60.9 | 60.0 |
| 1,2 (%) | 3.7 | 3.1 | 3.7 | 3.2 | 3.1 | 3.3 |
|  | 4.9 | 4.8 | 6.0 | 4.7 | 4.8 | 4.9 |
| Wt. % Propylene | 36.0 | 34.8 | 38.1 | 33.2 | 35.0 | 33.1 |
| DSV | 1.32 | 1.42 | 1.43 | 1.62 | 1.57 | 1.78 |
| Gel (%) | 0.0 | 0.0 | 0.0 | 0.0 | 0.0 | 0.0 |
| Tg (°C) | −80 | −81 | −78 | −81 | −81 | −80 |
|  |  |  |  | −106(s) | −105(s) | −103(vs) |

EXAMPLE VII

The procedure of Example I is repeated four times using phenyl methyl sulfoxide (C$_6$H$_5$SOCH$_3$) as the modifier in place of diphenyl sulfoxide. The proportions of catalyst components and the results are given in the table below:

TABLE VII

|  | A | B | C | D |
|---|---|---|---|---|
| mM Ti/phgm | 1.65 | 1.65 | 1.65 | 1.65 |
| SO/Ti ratio | 0.5/1 | 0.6/1 | 0.7/1 | 0.8/1 |
| Al/Ti ratio | 3/1 | 3/1 | 3/1 | 3/1 |
| Conversion (%) | 36.4 | 51.0 | 47.0 | 54.7 |
| IR Spectra |  |  |  |  |
| cis-1,4 (%) | 21.2 | 21.0 | 21.0 | 21.6 |
|  | 33.7 | 33.5 | 32.4 | 34.0 |
| trans-1,4 (%) | 36.0 | 39.0 | 36.9 | 38.1 |
|  | 59.8 | 60.7 | 60.9 | 60.1 |
| 1,2 (%) | 4.1 | 3.9 | 4.1 | 3.8 |
|  | 6.5 | 5.8 | 6.7 | 5.9 |
| Propylene (Wt. %) | 38.7 | 36.1 | 38.0 | 36.5 |
| DSV | 1.18 | 1.24 | 1.49 | 1.60 |
| Gel (%) | 0.0 | 0.0 | 0.0 | 0.0 |
| Tg (°C) | −74 | −78 | −79 | −78 |

EXAMPLE VIII

The procedure of Example VII is repeated except that larger proportions of phenyl methyl sulfoxide are used. These proportions and the results are shown in the table below:

TABLE VIII

|  | A | B | C | D |
|---|---|---|---|---|
| mM Ti/phgm | 1.65 | 1.65 | 1.65 | 1.65 |
| SO/Ti ratio | 0.9/1 | 1/1 | 1.2/1 | 1.4/1 |
| Al/Ti ratio | 3/1 | 3/1 | 3/1 | 3/1 |
| Conversion (%) | 53.0 | 54.7 | 41.0 | 25.5 |
| IR Spectra |  |  |  |  |
| cis-1,4 (%) | 28.5 | 23.0 | 26.0 | 34.5 |
|  | 42.2 | 35.9 | 37.8 | 49.5 |
| trans-1,4 (%) | 34.0 | 40.6 | 40.1 | 28.4 |
|  | 52.9 | 59.2 | 56.6 | 44.0 |
| 1,2 (%) | 3.3 | 3.3 | 3.7 | 4.2 |
|  | 4.9 | 4.9 | 5.6 | 6.5 |
| Propylene (Wt. %) | 34.2 | 33.1 | 30.2 | 32.9 |
| DSV | 1.82 | 1.99 | 2.12 | 2.25 |
| Gel (%) | 0.0 | 0.0 | 0.0 | 0.0 |
| Tg (°C) | −80 | −79 | −82 | −83 |
|  |  | −102(vs) | −105(s) | −103 (5:1) |

EXAMPLE IX

The procedure of Example I is repeated four times using dimethyl sulfoxide (CH$_3$SOCH$_3$) as the modifier in place of diphenyl sulfoxide. The proportions of catalyst components and the results are given in the table below:

TABLE IX

|  | A | B | C | D |
|---|---|---|---|---|
| mM Ti/phgm | 1.65 | 1.65 | 1.65 | 1.65 |
| SO/Ti ratio | 0.5/1 | 0.6/1 | 0.7/1 | 0.8/1 |
| Al/Ti ratio | 3/1 | 3/1 | 3/1 | 3/1 |
| Conversion (%) | 15.5 | 30.6 | 43.9 | 55.0 |
| IR Spectra |  |  |  |  |
| cis-1,4 (%) | 20.4 | 21.0 | 30.5 | 22.5 |
|  | 35.8 | 32.0 | 45.0 | 29.0 |
| trans-1,4 (%) | 38.2 | 38.5 | 30.6 | 37.0 |
|  | 58.1 | 61.3 | 50.4 | 64.3 |
| 1,2 (%) | 4.4 | 4.3 | 3.9 | 5.3 |
|  | 6.1 | 6.7 | 5.4 | 6.7 |
| Propylene (Wt. %) | 37.0 | 36.2 | 35.0 | 35.2 |
| DSV | 1.05 | 1.35 | 1.51 | 1.90 |
| Gel (%) | 0.0 | 0.0 | 0.0 | 0.0 |
| Tg (°C) | −74 | −74 | −78 | −80 |
|  |  | −80 |  |  |

EXAMPLE X

The procedure of Example IX is repeated with increasing proportions of the dimethyl sulfoxide modifier. These proportions and the results are shown in the table below:

TABLE X

|  | A | B | C | D |
|---|---|---|---|---|
| mM Ti/phgm | 1.65 | 1.65 | 1.65 | 1.65 |
| SO/Ti ratio | 0.9/1 | 1.0/1 | 1.2/1 | 1.4/1 |
| Al/Ti ratio | 3/1 | 3/1 | 3/1 | 3/1 |
| Conversion (%) | 59.0 | 58.5 | 54.0 | 45.7 |
| IR Spectra |  |  |  |  |
| cis-1,4 (%) | 23.3 | 25.0 | 27.9 | 46.0 |
|  | 33.0 | 33.7 | 38.0 | 61.9 |
| trans-1,4 (%) | 40.1 | 39.0 | 37.6 | 24.7 |
|  | 62.0 | 61.5 | 55.3 | 32.0 |
| 1,2 (%) | 3.7 | 3.2 | 4.5 | 4.6 |
|  | 5.0 | 4.8 | 6.7 | 6.1 |
| Propylene (Wt. %) | 32.9 | 32.8 | 30.0 | 24.7 |
| DSV | 1.99 | 1.87 | 2.25 | 2.60 |
| Gel (%) | 0.0 | 0.0 | 0.0 | 0.0 |
| Tg (°C) | −83 | −82 | −82 | −85 |
|  |  | −102(vs) | −105(s) | −103 (1:1) |

EXAMPLE XI

A series of copolymerizations using the same monomer blend and catalyst components as in Example I are conducted in a one-gallon stainless steel reactor equipped with a temperature-controlling device, a stirrer and sampling exit ports. The product is withdrawn directly into an isopropanol-antioxidant solution and the precipitated polymer is drum dried and analyzed. The conditions for polymerization and the results are given in Table XI.

TABLE XI

|  | A | B | C | D |
|---|---|---|---|---|
| mM Ti/phgm | 2.0 | 1.5 | 1.66 | 1.20 |
| SO/Ti ratio | 0.8/1 | 0.8/1 | 0.8/1 | 0.8/1 |
| Al/Ti ratio | 3.0/1 | 3.0/1 | 2.5/1 | 4.0/1 |
| Reaction Time (hrs.) | 22 | 21 | 24 | 24 |
| Polym. Temp. (°C) | −1-5 | −1-5 | −1-2 | −2-3 |
| Conversion (%) | 61.7 | 58.0 | 52.0 | 53.0 |
| IR Spectra |  |  |  |  |
| cis-1,4 (%) | 20.5 | 20.6 | 27.8 | 21.9 |
|  | 31.6 | 32.6 | 43.0 | 33.2 |
| trans-1,4 (%) | 40.7 | 38.8 | 33.0 | 39.4 |
|  | 62.6 | 61.5 | 51.0 | 59.7 |
| 1,2 (%) | 3.8 | 3.7 | 4.0 | 4.7 |
|  | 5.8 | 5.9 | 6.1 | 7.1 |
| Propylene (Wt. %) | 35.1 | 37.0 | 35.0 | 34.1 |
| DSV | 1.62 | 1.79 | 2.06 | 2.13 |
| Gel (%) | 0.0 | 0.0 | 0.0 | 0.0 |
| Tg (°C) | −80 | −80 | −82 | −75 |
|  | −104(s) | −104(vs) | −106(vs) | −100(s) |
| ML$_4$1212°F | 25 | 35 | 47 | 47 |
| Wms. Recovery | 0.83 | 1.25 | 1.47 | 1.33 |

EXAMPLE XII

The procedure of Example XI is repeated three times using bis(p-chlorophenyl) sulfoxide as the modifier in place of diphenyl sulfoxide. The proportions and results are shown in the table below:

TABLE XII

|  | A | B | C |
|---|---|---|---|
| mM Ti/phgm | 1.66 | 1.66 | 1.66 |
| SO/Ti ratio | 0.8/1 | 0.8/1 | 0.8/1 |
| Al/Ti ratio | 2.5 | 2.5 | 2.5 |
| Reaction Time (hrs.) | 21 | 24 | 24 |
| Polym. Temp. (°C) | 0-2 | −1-2 | 2-4 |
| Conversion (%) | 46.0 | 54.0 | 50.5 |
| IR Spectra |  |  |  |
| cis-1,4 (%) | 25.2 | 36.1 | 36.0 |
|  | 37.0 | 53.0 | 53.2 |
| trans-1,4 (%) | 39.4 | 28.4 | 28.3 |
|  | 57.7 | 41.5 | 41.7 |
| 1,2 (%) | 3.6 | 3.7 | 3.5 |
|  | 5.3 | 5.5 | 5.1 |
| Propylene (Wt. %) | 31.9 | 36.8 | 32.2 |
| DSV | 2.00 | 2.07 | 1.95 |
| Gel (%) | 0.0 | 0.0 | 0.0 |
| Tg (°C) | −82 | −82 | −80 |
|  | −104(s) | −104(vs) | −104(vs) |
| ML$_4$/212°F | 43 | 47 | 39.5 |
| Wms. Recovery | 1.49 | 2.08 | 1.40 |

EXAMPLE XIII

The procedure of Example XI is repeated twice except that the catalyst composition was pre-prepared at −25°C and added directly to the reactor without aging. The conditions and results are given in the table below:

TABLE XIII

| | A | B |
|---|---|---|
| mM Ti/phgm | 1.66 | 2.40 |
| SO/Ti ratio | 0.8/1 | 0.8/1 |
| Al/Ti ratio | 3/1 | 3/1 |
| Reaction Time (hrs.) | 22 | 22 |
| Polym. Temp. (°C) | 0–4.5 | 0–4.5 |
| Conversion (%) | 44.0 | 52.0 |
| IR Spectra | | |
| cis-1,4 (%) | 35.2 | 37.4 |
| | 50.0 | 53.3 |
| trans-1,4 (%) | 30.1 | 25.4 |
| | 42.8 | 36.4 |
| 1,2 (%) | 5.1 | 7.2 |
| | 7.2 | 10.3 |
| Propylene (Wt. %) | 29.6 | 30.0 |
| DSV | 2.71 | 3.22 |
| Gel (%) | 0.0 | 0.0 |
| Tg (°C) | −80 | −72 |
| | | −100 |
| | | (1:1) |
| ML$_4$1212°F | 74.8 | — |
| Wms. Recovery | 2.00 | — |

EXAMPLE XIV

The procedure of Example XIII is repeated five times exccept that the catalyst was pre-prepared at −30°C and an equipmolar mixtrue of diisobutyl aluminum hydride and triisobutyl aluminum is used as the reducing component. The conditions and results are given in the table below;

TABLE XIV

| | A | B | C | D | E |
|---|---|---|---|---|---|
| mM Ti/Phgm | 4.0 | 4.0 | 3.0 | 3.0 | 4.0 |
| SO/Ti ratio | 0.8/1 | 0.8/1 | 0.8/1 | 0.8/1 | 0.8/1 |
| Al/Ti ratio | 3/1 | 3/1 | 3/1 | 3/1 | 3/1 |
| Reaction Time (hrs.) | 7* | 4* | 6 | 6.5 | 6 |
| Polymer. Temp. (°C) | −23−11 | −33−(−12) | −47−(−26) | −39−(−24) | −41−(−28) |
| Conversion (%) | 61.0 | 55.3 | 24.0 | 42.0 | 45.0 |
| IR Spectra | | | | | |
| cis-1,4 (%) | 25.2 | 27.6 | 24.2 | 18.9 | 13.3 |
| | 36.5 | 40.7 | 38.4 | 28.5 | 23.6 |
| trans-1,4 (%) | 38.7 | 35.2 | 35.5 | 44.0 | 40.1 |
| | 56.2 | 51.9 | 56.1 | 66.4 | 71.3 |
| 1,2 (%) | 5.0 | 5.0 | 3.4 | 3.3 | 2.9 |
| | 7.3 | 7.4 | 5.5 | 5.0 | 5.1 |
| Propylene (Wt. %) | 31.1 | 32.2 | 36.8 | 33.8 | 43.6 |
| DSV | 1.23 | 1.53 | 1.78 | 2.33 | 1.62 |
| Gel (%) | 0.0 | 0.0 | 0.0 | 0.75 | 0.0 |
| Tg (°C) | −83 | −80 | −73 | −75 | −73 |
| | −105(vs) | −100(vs) | −100(vs) | −101(s) | |

*Exotherm occurred so that 50% copolymer was produced within first hour. It is apparent that the mixture of trialkyl aluminum and dialkyl aluminum hydride gives a faster reaction than either of the two when used by itself.

EXAMPLE XV

The procedure of Example I is repeated with the monomer mix comprising butadiene; propylene; toluene proportions of 6:9:85. The SO/Ti/Al proportions are 2:2:6 mM/phgm. similar results are obtained, with the polymer product containing 40% propylene.

EXAMPLE XVI

The procedure of Example I is repeated a number of times with satisfactory results using in place of the propylene equivalent amounts respectively of n-butene-1, n-pentene-1, n-hexene-1 and styrene, and using SO/Ti/Al proportions of 2:2:6 mM/phgm.

EXAMPLE XVII

The procedures of Examples I and XI are repeated with satisfactory results using in place of butadiene equivalent amounts of isoprene.

EXAMPLE XVIII

The procedure of Example I is repeated four times with satisfactory results using in place of TiCl$_4$ an equivalent amount respectively of:
 a. TiCl$_2$Br$_2$
 b. TiCl$_3$Br
 c. TiClBr$_3$
 d. TiBr$_4$

EXAMPLE XIX

The procedure of Example I repeated a number of times with satisfactory results using in place of diisobutyl aluminum hydride an equivalent amount respectively of
 a. Diethyl aluminum hydride
 b. Isobutyl aluminum dihydride
 c. Phenyl aluminum dihydride
 d. Cyclohexyl aluminum dihydride
 e. Hexyl aluminum dihydride
 f. Triethyl aluminum
 g. Triphenyl aluminum
 h. Diethyl cyclohexyl aluminum
 i. Aluminum trihydride

EXAMPLE XX

The procedure of Example I is repeated a number of times with satisfactory results using in place of the diphenyl sulfoxide an equivalent amount respectively of
 a. Diethyl sulfoxide
 b. Di tolyl sulfoxide
 c. Dioctyl sulfoxide
 d. Dicyclohexyl sulfoxide
 e. Methyl naphthyl sulfoxide

EXAMPLE XXI

The procedure of Example XI is repeated three times with satisfactory results using in place of the TiCl$_4$ an equivalent amount respectively of VCl$_5$, VCl$_3$Br$_2$ and VBr$_5$.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims.

The invention claimed is:

1. A process for the hydrocarbon solution polymerization of a monomer composition containing 10–90 percent by weight of a conjugated diene and 10–90 percent by weight of an alpha-olefin having 2–8 carbon atoms to produce a copolymer having 5–90 percent of the alpha-olefin in the resultant copolymer comprising the steps of maintaining said monomer composition at a temperature in the range of −30° to 50°C in intimate contact with a catalyst composition consisting essentially of:
   a. an aluminum compound of the formula $AlR_3$ where R is hydrogen or a hydrocarbon radical of 1–20 carbon atoms;
   b. a metal halide compound having the formula $TiBr_nCl_{4-m}$ or $VBr_mCl_{5-m}$ wherein $n$ has a value of 0–4 and $m$ has a value of 0–5, and
   c. sulfoxide of the formula $R_aSOR_b$ wherein $R_a$ and $R_b$ are hydrocarbon groups of 1–20 carbon atoms or chloroderivatives of said hydrocarbons in which the chlorine is attached to an aromatic nucleus;

the concentration of said titanium or vanadium halide being 0.1–4 millimoles per 100 grams of said monomer composition, said aluminum compound being present in a proportion of 1–4 moles per mole of titanium or vanadium halide, and said sulfoxide being present in a proportion of 0.7–4 moles per mole of titanium or vanadium halide, said polymerization being conducted for a period of at least 1 hour.

2. The process of claim 1 in which said diene is butadiene.

3. The process of claim 2 in which said alpha-olefin is propylene.

4. The process of claim 3 in which the ratio of said aluminum compound is about 2–3 moles per mole of said halide.

5. The process of claim 4 in which said halide is a titanium halide.

6. The process of claim 4 in which said halide is titanium tetrachloride.

7. The process of claim 6 in which said aluminum compound is a dialkyl aluminum hydride.

8. The process of claim 7 in which said hydride is diisobutyl aluminum hydride.

9. The process of claim 6 in which said aluminum compound is a trialkyl aluminum.

10. The process of claim 9 in which said aluminum compound is a triisobutyl aluminum.

11. The process of claim 6 in which said sulfoxide is diphenyl sulfoxide.

12. The process of claim 6 in which said sulfoxide is dimethyl sulfoxide.

13. The process of claim 6 in which said sulfoxide is bis (p-chlorophenyl).

14. The process of claim 6 in which said sulfoxide is methyl phenyl sulfoxide.

15. The process of claim 6 in which said aluminum compound is a mixture of trialkyl aluminum and a dialkyl aluminum compound.

16. The process of claim 6 in which said aluminum compound is a mixture of triisobutyl aluminum and diisobutyl aluminum hydride.

17. The process of claim 6 in which said temperature is 0°–50°C.

18. The process of claim 17 in which said monomer composition is 10–50 percent by weight propylene.

19. The process of claim 18 in which said sulfoxide is used in a proportion of 1–2 moles per mole of said halide.

PO-1050
(5/69)

UNITED STATES PATENT OFFICE
CERTIFICATE OF CORRECTION

Patent No. 3,914,207   Dated October 21, 1975

Inventor(s) Jung Wong Kang

It is certified that error appears in the above-identified patent and that said Letters Patent are hereby corrected as shown below:

In the first line of the "Abstract", insert "alpha-" immediately before "olefins".

In Column 4, Line 23, "over-dried" should read --oven-dried--.

In Column 13, Line 15 (Claim 1), "$TiBr_nCl_{4-m}$" should read --$TiBr_nCl_{4-n}$--.

Signed and Sealed this twenty-seventh Day of April 1976

[SEAL]

Attest:

RUTH C. MASON
Attesting Officer

C. MARSHALL DANN
Commissioner of Patents and Trademarks